(12) United States Patent
Brodd et al.

(10) Patent No.: US 9,539,925 B2
(45) Date of Patent: Jan. 10, 2017

(54) BUCKLE ARRANGEMENT

(71) Applicant: VOLVO CAR CORPORATION, Gothenburg (SE)

(72) Inventors: Joakim Brodd, Askim (SE); Mats Brodin, Skovde (SE)

(73) Assignee: VOLVO CAR CORPORATION (SE)

( * ) Notice: Subject to any disclaimer, the term of this patent is extended or adjusted under 35 U.S.C. 154(b) by 11 days.

(21) Appl. No.: 14/714,594

(22) Filed: May 18, 2015

(65) Prior Publication Data

US 2015/0343991 A1   Dec. 3, 2015

(30) Foreign Application Priority Data

May 27, 2014   (EP) .................................... 14170029

(51) Int. Cl.

| | |
|---|---|
| *B60N 2/58* | (2006.01) |
| *B60R 22/20* | (2006.01) |
| *A44B 11/25* | (2006.01) |
| *B60N 2/60* | (2006.01) |
| *B60R 22/26* | (2006.01) |
| *B60R 22/48* | (2006.01) |
| *B60R 22/18* | (2006.01) |

(52) U.S. Cl.
CPC ............. *B60N 2/58* (2013.01); *A44B 11/2503* (2013.01); *B60N 2/6009* (2013.01); *B60R 22/20* (2013.01); *B60R 22/26* (2013.01); *B60R 2022/1806* (2013.01); *B60R 2022/4816* (2013.01); *Y10T 24/45241* (2015.01)

(58) Field of Classification Search
CPC .......... B60R 22/20; B60R 22/26; B60N 2/58; B60N 2/6009; A44B 11/2503
USPC ....................................................... 297/482
See application file for complete search history.

(56) References Cited

U.S. PATENT DOCUMENTS

| | | | | |
|---|---|---|---|---|
| 3,841,658 A | * | 10/1974 | Singh ...................... | B60R 22/02 297/474 |
| 8,215,716 B2 | * | 7/2012 | Akaike .............. | A44B 11/2523 297/468 |
| 2009/0094807 A1 | | 4/2009 | Sugimoto et al. | |

FOREIGN PATENT DOCUMENTS

| | | |
|---|---|---|
| DE | 3439076 A1 | 4/1986 |
| DE | 102005039256 A1 | 2/2007 |
| JP | 2010064639 A * | 3/2010 |

(Continued)

OTHER PUBLICATIONS

Extended European Search Report Dated Dec. 11, 2014, Application No. 14170029.4-1758, Applicant Volvo Car Corporation, 7 Pages.

*Primary Examiner* — Anthony D Barfield
(74) *Attorney, Agent, or Firm* — Brooks Kushman P.C.

(57) ABSTRACT

The present disclosure relates to a buckle arrangement for a seat for a vehicle or vessel. The buckle arrangement comprises a casing, an insertion slot for inserting a latch into the casing, a locking mechanism for locking the latch and a release element for releasing the locking mechanism, allowing releasing of the latch. The locking mechanism is enclosed in the casing and the insertion slot is adapted for guiding the latch to the locking mechanism. The buckle arrangement further comprises an insertion frame surrounding the insertion slot and a buckle frame surrounding the insertion frame and the release element, wherein the insertion frame is connectable to the casing in such a way that a portion of a skin of the seat is clampable between the insertion frame and the casing. The disclosure further relates to a seat for a vehicle or vessel comprising such a buckle arrangement.

20 Claims, 3 Drawing Sheets

(56) References Cited

FOREIGN PATENT DOCUMENTS

JP   2011102085 A  *  5/2011
WO   WO 0114175 A1 *  3/2001  ............... B60N 2/58

* cited by examiner

BUCKLE ARRANGEMENT

CROSS-REFERENCE TO RELATED APPLICATIONS

This application claims foreign priority benefits under 35 U.S.C. §119(a)-(d) to European patent application number EP 14170029.4, filed May 27, 2014, which is incorporated by reference in its entirety.

TECHNICAL FIELD

The present disclosure relates to a buckle arrangement for a seat for a vehicle or vessel. The disclosure further relates to a seat comprising such a buckle arrangement.

BACKGROUND

A seat in a vehicle, such as a car, bus, truck or lorry, or in a vessel, such as a boat, ferry or aircraft, may be provided with a safety belt in order to protect the user of the seat in case of a collision. In a common configuration of the safety belt, a latch portion is to be inserted into a buckle arrangement in order to lock the latch in the buckle, thereby buckling up the user of the seat.

According to known technology, the buckle arrangement is connected to the seat or to the body of the vehicle or vessel. The buckle arrangement is normally arranged beside the seat, if the seat is a single seat, e.g., a front seat of a vehicle. If the seat is a combined seat comprising seats for more than one person, e.g., a rear seat of a vehicle, the buckle arrangement often lies on top of the seat. In both cases, there is a risk that a piece of clothes of the user, e.g., a jacket, gets caught in the buckle arrangement. Further, if the user wants to place a bag on an adjacent seat, such as a handbag, a strap or belt of the bag may get entangled in the buckle arrangement of the user's seat or of the adjacent seat. If the seat is a rear seat, the buckle arrangement may make lateral displacement in the seat, e.g., in order to reach the central rear seat, more difficult.

Patent document US 2009/0094807 A1 discloses a rear seat with a buckle arrangement, in which the buckle is located in a recess of the seat, when an occupant is not seated, and is arranged to stand up from the seat, when the occupant is seated in the seat.

However, patent document US 2009/0094807 A1 only relates to rear seats. Further, although the risk of clothes or straps getting caught or entangled is less when the buckle is in the recess than when standing up, there is still such a risk.

SUMMARY

An object of the present disclosure is to overcome or ameliorate at least one of the disadvantages of the prior art, or to provide a useful alternative.

Thus, in a first aspect of the present disclosure there is provided a buckle arrangement for a seat for a vehicle or vessel. The buckle arrangement comprises a casing, an insertion slot for inserting a latch into the casing, a locking mechanism for locking the latch and a release element for releasing the locking mechanism, allowing releasing of the latch. The locking mechanism is enclosed in the casing and the insertion slot is adapted for guiding the latch to the locking mechanism. The buckle arrangement further comprises an insertion frame surrounding the insertion slot and a buckle frame surrounding the insertion frame and the release element, wherein the insertion frame is connectable to the casing in such a way that a portion of a skin of the seat is clampable between the insertion frame and the casing.

Since such a buckle arrangement is suitable for being recessed in the seat, the risk of clothes or straps getting caught or entangled is reduced or even eliminated. Further the visual impression of the seat is improved.

The latch may be a latch of a safety belt, e.g., a plug-in latch of a commonly used three-point safety belt of a vehicle, or a belt used for retaining cargo in the vehicle or vessel. The seat may be a seat of a vehicle, such as a car, bus, truck or lorry, of a vessel, such as a boat, ferry or an aircraft. The seat may be used by a driver or pilot, or by a passenger. In a vehicle, the seat may be a driver's seat, a front passenger seat or a rear seat.

The seat is at least partly covered by the skin, which forms an outer surface of the seat. The skin may comprise, or be constituted by, leather, textile or plastics, or a combination of these materials. Often the seat comprises one or more pads forming a squab and a seatback. The skin then forms the outer surface of the respective pads.

The insertion slot is surrounded by an insertion frame defining the opening of the insertion slot. The insertion frame is at least partly located above the skin and is connected to the casing in such a way that the skin is clamped between the insertion frame, whereof at least a portion is located above the skin, and the casing, being located below the skin. There is an opening in the skin corresponding to the insertion slot, such that the latch is insertable into the casing through this opening in the skin. The dimensions of the insertion frame are selected to provide an insertion slot of suitable size and shape to receive the latch.

The insertion frame and the release element are surrounded by a buckle frame. The open area of the buckle frame is hence larger than the open area of the insertion frame. The buckle frame may be located beneath the skin, thereby supporting the portion of the skin being located around the insertion frame and the release element. The buckle frame may be constituted by or comprised in a top portion of the casing, supporting the skin from below. As an alternative, the buckle frame may be a separate component attached to the casing, e.g., on the top surface of the casing. The skin may then be clamped between the insertion frame being above the skin and the casing and/or the buckle frame being below the skin.

As yet an alternative, the buckle frame may be located on top of the skin. It may in that case be a separate unit or it may be combined with the insertion frame, thus forming an integrated unit. In that case, the skin may be clamped between the insertion frame and the buckle frame being above the skin and the casing being below the skin.

The dimensions of the buckle frame may be selected such that the release element can be pressed down by an object having a finger-size, but not by an object of elbow-size. Thereby the risk of unintended release of the latch is avoided, or at least reduced. Unintended release may be caused by debris flying around in the vehicle during a collision or when the user moves in the seat. Hence, the open area of the buckle frame may be larger than a finger but less than an elbow. This function may be tested by pressing a test ball against the release element, which should not release if the diameter of the ball is above a certain test diameter. The test diameter may vary from manufacturer to manufacturer, but some test diameters which are commonly utilized are 30 mm, 32 mm or 40 mm.

The buckle arrangement may further comprise a first attachment member for attachment of the buckle arrangement to the seat or a vehicle body at a first anchoring location. There will then be a load transfer path from the latch of the safety belt, which is insertable into the buckle arrangement, via the buckle arrangement to the seat or to the vehicle body. If attached to the seat, the seat is in turn attachable to the body of the vehicle or vessel providing a load path to the body of the vehicle.

A suitable material for the first attachment member is metal, e.g., forming one or more wires or rods. The first attachment member is preferably strong enough to withstand the forces that may be applied to the buckle arrangement from the safety belt in case of a collision, e.g., when the user of the seat is thrown forwards in the seat.

The first attachment member may be adapted to be attached to the seat or vehicle body in a way allowing pivotal and/or linear displacement of the attachment member in relation to the seat or vehicle body at the first anchoring location. This kind of attachment allows the buckle arrangement to follow the movement of the user of the safety belt during a collision.

The buckle arrangement including the first attachment member is preferably configured such that it fulfills current legal requirements and standards, e.g., FMVSS 208, FMVSS 209 and FMVSS 210 utilized in e.g., the US and the treaty "Agreement concerning the adoption of uniform technical prescriptions for wheeled vehicles, equipment and parts which can be fitted to and/or be used on wheeled vehicles and the conditions for reciprocal recognition of approvals granted on the basis of these prescriptions", Regulation No. 14 "Uniform provisions concerning the approval of vehicles with regard to safety-belt anchorages, ISOFIX anchorages systems and ISOFIX top tether anchorages".

The buckle arrangement may further comprise a second attachment member for attachment of the buckle arrangement to the seat or to vehicle body at a second anchoring location, which is different from the first anchoring location. The second attachment member is weaker than the first attachment member. A suitable material for the second attachment member is plastic, textile or metal, e.g., forming a belt, strap, wire or a rod.

The second anchoring location may be located forward or rearward of the first anchoring location, as seen in a longitudinal direction of the vehicle or vessel, in which the buckle arrangement is intended to be mounted, the longitudinal direction of the vehicle or vessel being its normal driving direction. The second anchoring location may be straight in front of or behind the first anchoring location, such that there is no lateral difference between the first anchoring location and the second anchoring location, as seen in a lateral direction of the vehicle or vessel, in which the buckle arrangement is intended to be mounted, the lateral direction of the vehicle or vessel being perpendicular to its normal driving direction.

The mechanical properties of the second attachment member are preferably selected such that the second attachment member is much weaker than the first attachment member, it may e.g., have less than 10% of the strength, or preferably less than 5% or more preferably less than 1% of the strength. The strength may be measured in the longitudinal direction of the respective attachment member or in the longitudinal direction of the vehicle or vessel. However, the second attachment member is preferably configured, such that it is strong enough to cope with normal usage of the buckle arrangement. It is desirable that it is possible to sit on the portion of the seat being located above the second attachment member without breaking the second attachment member. The second attachment member may e.g., comprise a material which is flexible such that it will bend if somebody sits on top of it, but will break in case of a collision.

During normal usage of the buckle arrangement, the first attachment member and the second attachment member will together retain the buckle arrangement in a fixed position relative to the seat. The position is fixed in all three dimensions. However, in case of a collision involving the vehicle with the buckle arrangement, the second attachment member will collapse, e.g., by breaking off, such that the buckle arrangement is attached only by the first attachment member. The buckle arrangement can then be pivotally and/or linearly displaced in relation to the seat at the first anchoring location, such that the buckle arrangement can follow the displacement of the user of the safety belt in a forward direction of the vehicle.

The function of the second attachment member is to fixate the buckle arrangement relative to the seat during normal usage, but to allow for pivotal and/or linear displacement of the buckle arrangement in relation to the seat in case of a collision. The buckle arrangement assuming a fixed predefined position during normal usage is useful when the buckle arrangement is located in a recess in a pad of the seat, since the recess then can have a shape and a size adapted to fit the casing of the buckle arrangement. Since the buckle arrangement does not move relative to the seat during normal usage, the recess does not need to be oversized to allow for any extra movements during normal usage, but can have just the size to fit the casing. Thereby it is possible to use a smaller recess than compared to known technology, as e.g., disclosed by patent document US 2009/0094807 A1.

The longitudinal direction of the first attachment member and the longitudinal direction of the second attachment member may be substantially perpendicular to each other. However, they may assume any useful angle in relation to each other. The longitudinal direction of the attachment member is defined as the direction in which the attachment member has its largest extension.

The first attachment member may have a longitudinal direction, which extends substantially in the vertical direction of the vehicle or vessel, in which the buckle arrangement is intended to be mounted. The second attachment member may have a longitudinal direction, which extends substantially in the longitudinal direction of the vehicle or vessel, in which the buckle arrangement is intended to be mounted.

The second attachment member may comprise a weakening portion for a predefined collapse of the second attachment member. The weakening portion may be configured to break at predefined level of applied load. The weakening portion may be configured to break in a predefined location. The weakening portion may e.g., have a smaller cross-sectional area than the rest of the second attachment member.

The insertion frame and/or the release element may have a curved top surface. The curvature may be selected to correspond to a curvature of the seat, into which the buckle arrangement is to be recessed, such that the insertion frame and/or the release element follow/s the curvature of the seat.

In a second aspect of the present disclosure, there is provided a seat for a vehicle or a vessel. The seat comprises a buckle arrangement, as described herein, at least one pad, and a skin. The skin is adapted to cover at least a portion of the pad adapted to receive a user of the seat. The buckle arrangement is recessed in the pad in such a way that the insertion slot and the release element are operable from an outside of the seat, while at least a portion of the casing is located beneath the skin.

The casing is thus located at a level below the skin. Further, at least a portion of the top surface of the casing is covered below the skin, such that this portion cannot be seen from outside the seat.

Since the buckle arrangement is recessed in the pad as described herein and the casing at last partly being covered below the skin, the risk of clothes or straps getting caught or entangled is reduced or even eliminated.

As mentioned above, the seat may be a seat of a vehicle, such as a car, bus, truck or lorry, of a vessel, such as a boat, ferry or an aircraft. The seat may be used by a driver or pilot, or by a passenger. In a vehicle, the seat may be a driver's seat, a front passenger seat or a rear seat.

The seat comprises one or more pads, e.g., forming a squab and a seatback. The squab is intended to receive and support a bottom of the user, while the seatback is intended to receive and support a back of the user. The skin then forms the outer surface of the respective pads. The seat is at least partly covered by the skin, which forms an outer surface. The skin may comprise, or be constituted by, leather, textile or plastics, or a combination of these. The pad may comprise, or be constituted by, foam rubber, offering the user of the seat a comfortable and/or ergonomic seat. The pad may comprise different pad portions, such as a right-hand portion, a central portion and a left-hand portion. The pad portions may be units separate from each other, or they may be a continuous unit delimited by e.g., one or more seams. The buckle arrangement may be recessed in the pad of a squab or a seatback.

The casing of the buckle arrangement may be fully recessed in the pad. The whole casing may be located beneath the skin. The casing may be invisible from the outside of the seat.

The insertion frame and the release element are surrounded by a buckle frame. The buckle frame may be located beneath the skin, supporting the portion of the skin being located around the insertion frame and the release element. The buckle frame may be constituted by or comprised in a top portion of the casing, supporting the skin from below. As an alternative it may be a separate component attached to the casing. As yet an alternative, the buckle frame may be located on top of the skin. It may in that case be a separate unit or it may be combined with the insertion frame, thus forming an integrated unit.

The dimensions of the buckle frame may be selected such that the release element can be pressed down by an object having a finger-size, but not by an object of elbow-size. Thereby the risk of unintended release of the latch is avoided, or at least reduced. Unintended release may be caused by debris flying around in the vehicle during a collision or when the user moves in the seat. Hence the open area of the buckle frame may be larger than a finger but less than an elbow. This function may be tested by pressing a test ball against the release element, which should not release if the diameter of the ball is above a certain test diameter. The test diameter may vary from manufacturer to manufacturer, but some test diameters which are commonly utilized are 30 mm, 32 mm or 40 mm.

There is an opening in the skin corresponding to the insertion slot, such that the latch is insertable into the casing through this opening in the skin. The dimensions of the insertion frame are selected to provide an insertion slot of suitable size and shape to receive the latch.

A portion of the skin of the seat may be clamped between the insertion frame and the casing of the buckle arrangement or between the insertion frame and the buckle frame. Thereby the buckle arrangement will have a defined position in relation to the skin. Further, the risk of an interspace appearing between the opening in the skin for the insertion slot and the insertion frame may be avoided.

The skin may comprise a release patch adapted to cover the release element of the buckle arrangement. The release patch may be attached to the rest of the skin in a position corresponding to that of the release element, e.g., by sewing, gluing or welding the release patch to the rest of the skin. In order to be easily found by the user of the buckle arrangement, the release patch may have another color and/or texture than the rest of the skin. It may be made of another material. The release patch may e.g., be made of red-colored leather, textile or plastic. The material of the release patch may be flexible, such that the release element may be released, e.g., by being pressed down, when pressing on the release patch by e.g., a finger.

As an alternative to the release patch, the skin may have an additional opening, which corresponds to the position of the release element, such that the user can interact directly with the release element, e.g., by pressing on it. The opening in the skin may in that case be the same opening as for the insertion slot, or two separate openings may be used.

A surface of the release element, or the release patch, if any, may be located in a range of −10 mm to +10 mm in relation to a surface of the skin, preferably located in a range of −5 mm to +5 mm, more preferably located in a range of −2 mm to +2 mm, most preferably located in a range of −1 mm to +1 mm.

The insertion frame and the release patch, or the release element, may protrude from the surface of the skin, e.g., by up to 10 mm, preferably up to 5 mm, more preferably up to 2 mm and most preferably by up to 1 mm. It may also be flush with the surface of the skin, i.e., substantially not protruding at all. As yet an alternative, the release patch, or the release element, may located lower than the surface of the skin, e.g., by up to 10 mm, preferably up to 5 mm, more preferably up to 2 mm and most preferably by up to 1 mm.

If the insertion frame and the release patch, or the release element is at another level than the surface of the skin, i.e., protruding or being located lower, the user of the seat may easily find them just by the touch without actually seeing them. This may be good if the user looks in another direction at the same time as he or she wants to buckle up or to unbuckle, or if it is dark in the vehicle or vessel.

In many seats the pads have a curved surface, e.g., forming a bucket seat. Then the insertion frame and/or the release element may have a curved top surface following the curvature of the pad or seat.

The seat may comprise a framework providing the first anchoring location and/or the second anchoring location. If the seat is displaceable in relation to vehicle body, e.g., in order to adjust a suitable driving position, it may be advantageous to attach the buckle arrangement in the framework of the seat, such that the first anchoring location and/or the second anchoring location follow/s the seat during displacement.

In a third aspect of the present disclosure, there is provided a safety belt arrangement comprising a buckle arrangement as described herein, a safety belt and a latch. The latch is adapted to cooperate with the buckle arrangement, as described herein, and is attached to the safety belt.

In a fourth aspect of the present disclosure, there is provided a vehicle or a vessel comprising a buckle arrangement as described herein or a seat as described herein.

BRIEF DESCRIPTION OF THE DRAWINGS

The present disclosure will hereinafter be further explained by means of non-limiting examples with reference to the attached drawings.

It should be noted that the appended drawings are not necessarily drawn to scale and that the dimensions of some features of the present disclosure may have been exaggerated for the sake of clarity.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
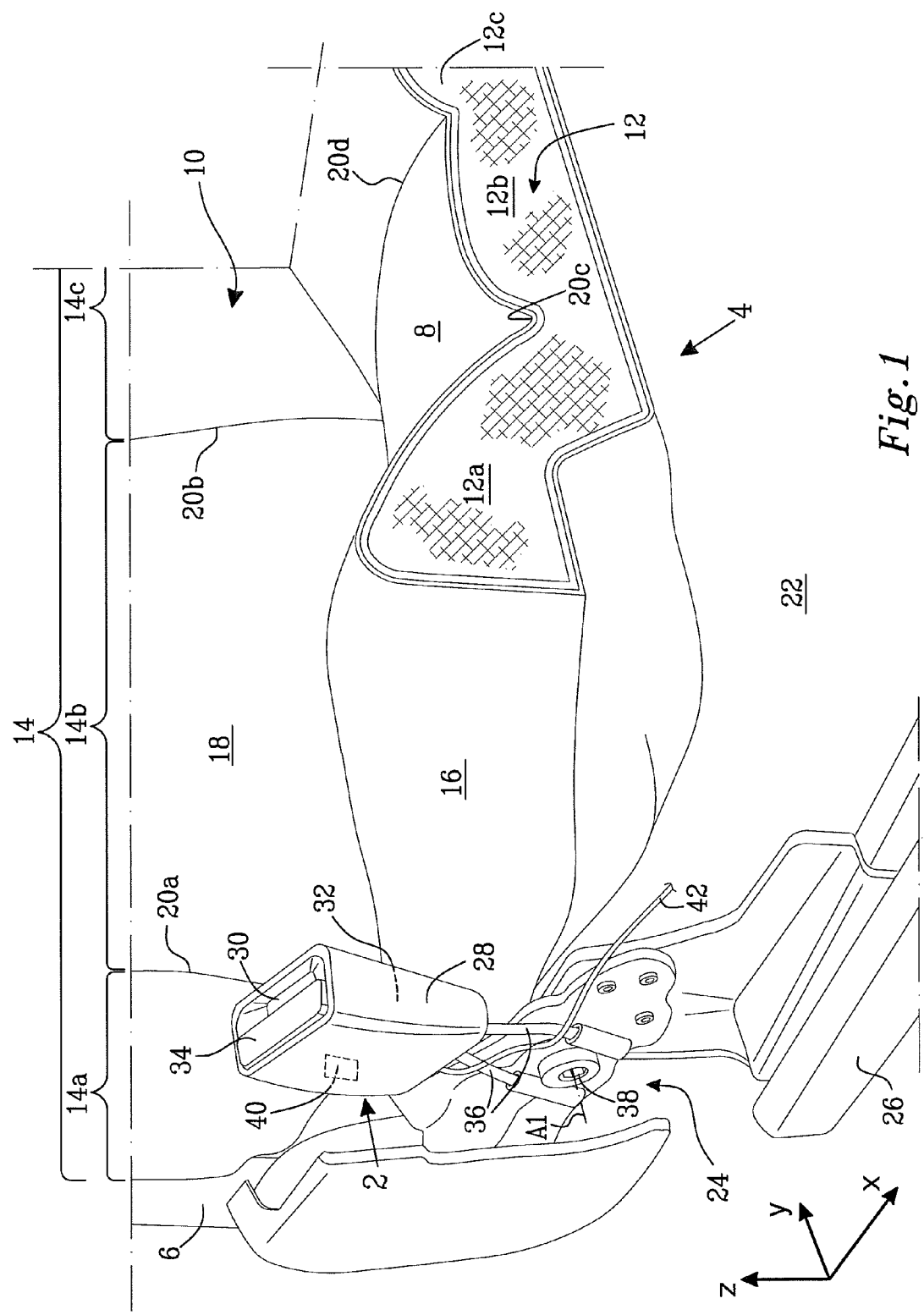
FIG. 1 illustrates a buckle arrangement according to prior art mounted beside a seat according to prior art.

FIG. 1 illustrates a buckle arrangement 2 according to prior art mounted beside a vehicular seat 4. The buckle arrangement 2 is adapted to receive a latch of a safety belt, not illustrated, e.g., a plug-in latch of a commonly used three-point safety belt. The illustrated seat 4 is a driver's seat of a vehicle, but similar buckle arrangements are used for other seats in the vehicle, such as for a front passenger seat and a rear seat.

The seat 4 comprises the buckle arrangement 2, a framework 6, a squab 8 and a seatback 10. The buckle arrangement 2, the squab 8 and the seatback 10 are attached to the framework 6.

The squab 8 and the seatback 10 are adapted to support a user sitting in the seat 4. The squab 8 comprises a first pad 12 for receiving the bottom of the user and providing the user with a comfortable and/or ergonomic seat, e.g., comprising foam rubber. The seatback 10 comprises a second pad 14 for receiving the back of the user providing the user with a comfortable and/or ergonomic seatback, e.g., also comprising foam rubber. The pads 12, 14 are covered by a respective skin 16, 18, which forms an outer surface of the respective pad 12, 14. The skins 16, 18 may comprise, or be constituted by, leather, textile or plastics, or a combination of these materials.

The first pad 12 and/or the second pad 14 may comprise different pad portions, such as a right-hand portion 12a, 14a, a central portion 12b, 14b and a left-hand portion 12c, 14c. The pad portions 12a-c, 14a-c may be units separate from each other, or they may be a continuous unit delimited by e.g., one or more seams 20a, 20b, 20c, 20c, as is illustrated.

An upper portion of the framework 6 is located inside the seatback 10 and the squab 8, and is thus concealed by the skins 16, 18. The seat 4 is attached to a vehicle floor 22 by means of a lower portion 24 of the framework 6. In the illustrated example the lower portion 24 of the framework 6 is connected via a rail 26 to the vehicle floor 22. The rail 26 makes it possible to displace the seat 4 in a longitudinal direction x of the vehicle, e.g., in order to make it possible for the user of the seat 4 to find a desired position of the seat 4 relative to the vehicle floor 22.

The buckle arrangement 2 comprises a casing 28. The casing 28 encloses an insertion slot 30 for inserting the latch into the casing 28. The casing 28 further comprises a locking mechanism 32 for locking the latch in the buckle arrangement 2. The insertion slot 30 is adapted for guiding the latch to the locking mechanism 32. The locking mechanism 32 locks the latch of the safety belt, when the user has buckled up. The casing 28 further encloses a release element 34. The release element 34 is used to release the locking mechanism 32, when the user wants to unbuckle, by allowing the latch to leave the locking mechanism 32 and the casing 28.

The casing 28 is attached via a first attachment member 36 to the lower portion 24 of the framework 6 at a first anchoring location 38. There is hence a load transfer path from the latch of the safety belt, via the buckle arrangement 2 and the framework 6 to the vehicle body. The first attachment member 36 is pivotally attached to the lower portion 24 of the framework 6 at the first anchoring location 38. Thereby the buckle arrangement 2 can be pivotally displaced in relation to the framework 6 at the first anchoring location 38, such that the buckle arrangement 2 can follow the displacement of the user of the safety belt in a forward direction of the vehicle, e.g., in case of a collision. A pivotal axis A1 of the first attachment member 36 at the first anchoring location 38 is substantially parallel to a lateral direction y of the vehicle.

The buckle arrangement 2 further comprises a sensor 40, which is adapted to detect if there is a latch in the buckle or not. The sensor is connected by an electrical wire 42 to a control system of the vehicle, which may send a warning if the user has not buckled up when the vehicle is moving.

Since the buckle arrangement 2 is located beside the squab 8 as a separate item, there is a risk that a piece of clothes of the user, e.g., a jacket, gets caught in the buckle arrangement 2. Further, if the user wants to place a bag, such as a handbag, on an adjacent seat, a strap or belt of the bag may get entangled in the buckle arrangement 2 of the user's seat 4 or of the adjacent seat.

Figure 2:
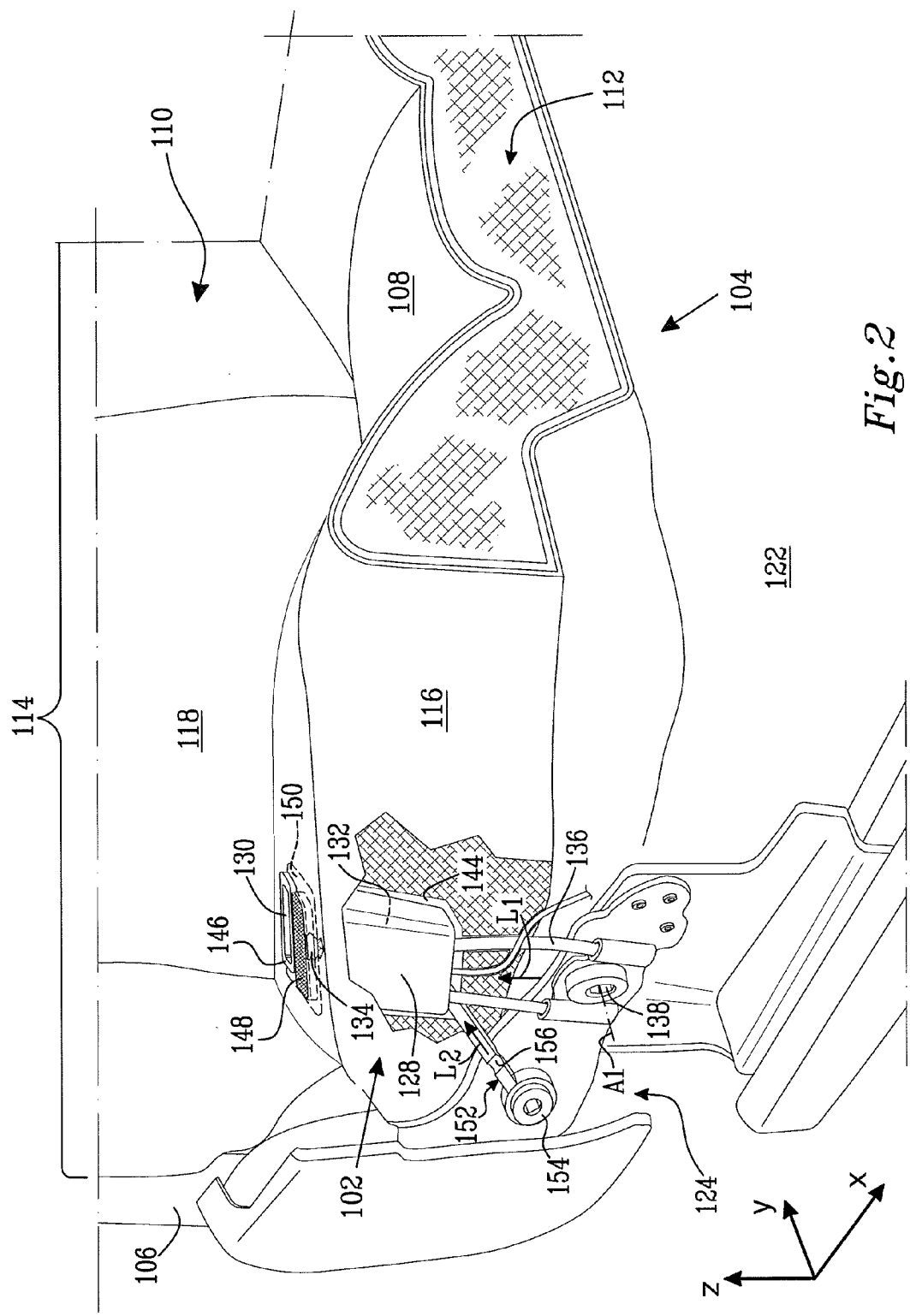
FIG. 2 illustrates a buckle arrangement mounted in a seat according to a first embodiment of the disclosure.

FIG. 2 illustrates a buckle arrangement 102 according to a first embodiment of the disclosure mounted in a seat 104 according to the disclosure. Elements which are present both according to known technology, see prior art in FIG. 1, and according to the disclosure are referred to by the same reference number as in FIG. 1 +100. For example, the buckle arrangement 2 of FIG. 1 corresponds to the buckle arrangement 102 of FIG. 2. The illustrated seat of FIG. 2 is a driver's seat 104 of a vehicle, but buckle arrangements according to the disclosure may be used for other seats in the vehicle, such as for a front passenger seat and a rear seat.

The seat 104 comprises the buckle arrangement 102, a framework 106, a squab 108 and a seatback 110. The buckle arrangement 102, the squab 108 and the seatback 110 are attached to the framework 106. The framework 106 of the seat 104 is attached to the vehicle floor 122 in a corresponding way as for the seat 4 of FIG. 1.

The squab 108 comprises a first pad 112 and the seatback 110 comprises a second pad 114. The pads 112, 114 are covered by a skin 116, 118, which forms an outer surface of the respective pad 112, 114. The skin 116, 118 may comprise, or be constituted by, leather, textile or plastics, or a combination of these. The pads 112, 114 correspond to those 12, 14 of known seats 4, except that one of the pads 112, 114, in the illustrated example the pad 112 of the squab 108 comprises a recess 144 for receiving the buckle arrangement 102. In the illustrated example, the right-hand portion 112a of the squab 108 comprises the recess 144.

The buckle arrangement 102 comprises a casing 128. The casing 128 encloses an insertion slot 130 for inserting the latch into the casing 128. The casing 128 further comprises a locking mechanism 132 for locking the latch. The insertion slot 130 is adapted for guiding the latch to the locking mechanism 132. The locking mechanism 132 locks the latch of the safety belt, when the user has buckled up. The casing 128 further encloses a release element 134. The release element 134 is used to release the locking mechanism 132, when the user wants to unbuckle, by allowing the latch to leave the casing 128.

The casing 128 is located in the recess 144 in such a way that the insertion slot 130 and the release element 134 are operable from an outside of the seat 104. Since the casing 128 is located in the recess 144 beneath the skin 116, the casing 128 is invisible from the outside. The insertion slot 130 is surrounded by an insertion frame 146 defining the opening of the insertion slot 130. The insertion frame 146 is located above the skin 116 and is connected to the casing 128 in such a way that the skin 116 is clamped between the insertion frame 146 and the casing 128. There is further an opening in the skin 116 corresponding to the insertion slot 130, such that the latch is insertable into the casing 128 through this opening in the skin 116. The dimensions of the insertion frame 146 are selected to provide an insertion slot 130 of suitable size and shape to receive the latch.

The skin 116 comprises a release patch 148, which is attached to the rest of the skin 116 in a position corresponding to that of the release element 134, e.g., by sewing, gluing or welding the release patch 148 to the rest of the skin 116. In order to be easily found by the user of the buckle arrangement 102, the release patch 148 may have another color and/or texture than the rest of the skin 116. It may e.g., be made of another material, e.g., red-colored leather or textile. The material of the release patch 148 is flexible, such that the release element 134 is released, e.g., by being pressed down, when pressing on the release patch 148.

As an alternative to the release patch 148, the skin 116 may have an additional opening, which corresponds to the position of the release element 134, such that the user can interact directly with the release element 134, e.g., by pressing on it. The opening in the skin 116 may be the same opening as for the insertion slot 130 or two separate openings may be used.

The insertion frame 146 and the release patch 148, or the release element 134, may protrude somewhat from the surface of the skin 116, e.g., by up to 10 mm, preferably up to 5 mm, more preferably up to 2 mm and most preferably by up to 1 mm. It may also be flush with the surface of the skin 116, i.e., substantially not protruding at all. As yet an alternative, the release patch 148, or the release element 134, may be located lower than the surface of the skin 116, e.g., by up to 10 mm, preferably up to 5 mm, more preferably up to 2 mm and most preferably by up to 1 mm. If the insertion frame 146 and the release patch 148, or the release element 134 is at another level than the surface of the skin 116, i.e., protruding or being located lower, the user of the seat 104 may easily find them just by the touch without actually seeing them. This may be good if the user looks in another direction at the same time as he or she wants to buckle up or to unbuckle, or if it is dark in the vehicle or vessel.

In many seats the pads 112, 114 have a curved surface, e.g., forming a bucket seat. In that case the insertion frame 146 and/or the release element 134 may have a top surface following the curvature of the seat 104.

The insertion frame 146 and the release element 134 are surrounded by a buckle frame 150. In the illustrated example the buckle frame 150 is located beneath the skin 116, supporting the portion of the skin 116 being located around the insertion frame 146 and the release element 134. The skin 116 is thus in the illustrated example clamped between the insertion frame 146 and the buckle frame 150. The buckle frame 150 is in the illustrated example constituted by a top portion of the casing 128, but may as an alternative be a separate component attached to the casing 128. As yet an alternative, the buckle frame 150 may be located on top of the skin 116. It may in that case be a separate unit or it may be combined with the insertion frame 146 to an integrate unit. The dimensions of the buckle frame 150 are selected such that the release element 134 can be pressed down by an object having a finger-size, but not by an object of elbow-size. Thereby the risk of unintended release of the latch is avoided, or at least reduced. Unintended release may be caused by debris flying around in the vehicle during a collision or when the user moves in the seat 104.

The casing 128 is attached via a first attachment member 136 to the lower portion 124 of the framework 106 at a first anchoring location 138 in a similar way as for the prior art buckle arrangement 2 of FIG. 1. There is, hence, a load transfer path from the latch of the safety belt, via the buckle arrangement 102 and the framework 106 to the vehicle body. The first attachment member 136 is pivotally attached to the lower portion 124 of the framework 106 at the first anchoring location 138. The pivotal axis A1 at the first anchoring location 138 is substantially parallel to the lateral direction y of the vehicle.

However, as a contrast to FIG. 1, the buckle arrangement 102 also comprises a second attachment member 152 connecting the buckle arrangement 102 to the lower portion 124 of the framework 106 at a second anchoring location 154, which is different from the first anchoring location 138, here behind the first anchoring location 138 as seen in the longitudinal direction x of the vehicle. The first attachment member 136 has a longitudinal direction L1, which extends substantially in a vertical direction z of the vehicle. The second attachment member 152 has a longitudinal direction L2, which extends in the longitudinal direction x and the vertical direction z of the vehicle. The mechanical properties of the second attachment member 152 are selected such that the second attachment member 152 is much weaker than the first attachment member 136. It may e.g., have less than 10% of the strength, or preferably less than 5% or more preferably less than 1% of the strength. The strength may be measured in the longitudinal direction of the respective attachment member or in the longitudinal direction of the vehicle or vessel. However, the second attachment member 152 is configured, such that it is strong enough to cope with normal usage of the buckle arrangement 102. It should e.g., be possible to sit on the portion of the squab 108 being located above the second attachment member 152 without breaking the second attachment member 152. The second attachment member 152 may e.g., comprise a material which is flexible such that it will bend if somebody sits on top of it, but will break in case of a collision. In the illustrated example the second attachment member 152 has a weakening portion 156, which is configured to provide a predefined collapse of the second attachment member 152 in case of a collision.

During normal usage of the buckle arrangement 102, the first attachment member 136 and the second attachment member 152 will together retain the buckle arrangement 102 in a fixed position relative to the seat 104. However, in case of a collision involving the vehicle with the seat 104, the second attachment member 152 will collapse, e.g., by breaking off at the weakening portion 156, such that the buckle arrangement 102 only is attached by the first attachment member 136. The buckle arrangement 102 can then be pivotally displaced in relation to the framework 106 at the first anchoring location 138, such that the buckle arrangement 102 can follow the displacement of the user of the safety belt in a forward direction of the vehicle, corresponding to what is described above in conjunction with FIG. 1.

In the illustrated example, the longitudinal direction L1 of the first attachment member 136 and the longitudinal direction L2 the second attachment member 152 assume an angle of about 45° relative to each other. However, they may assume any useful angle in relation to each other. The function of the second attachment member 152 is to fixate the buckle arrangement 102 relative to the seat 104 during normal usage, but allow for the pivotal displacement around the pivotal axis A1 in case of a collision.

Figure 3:
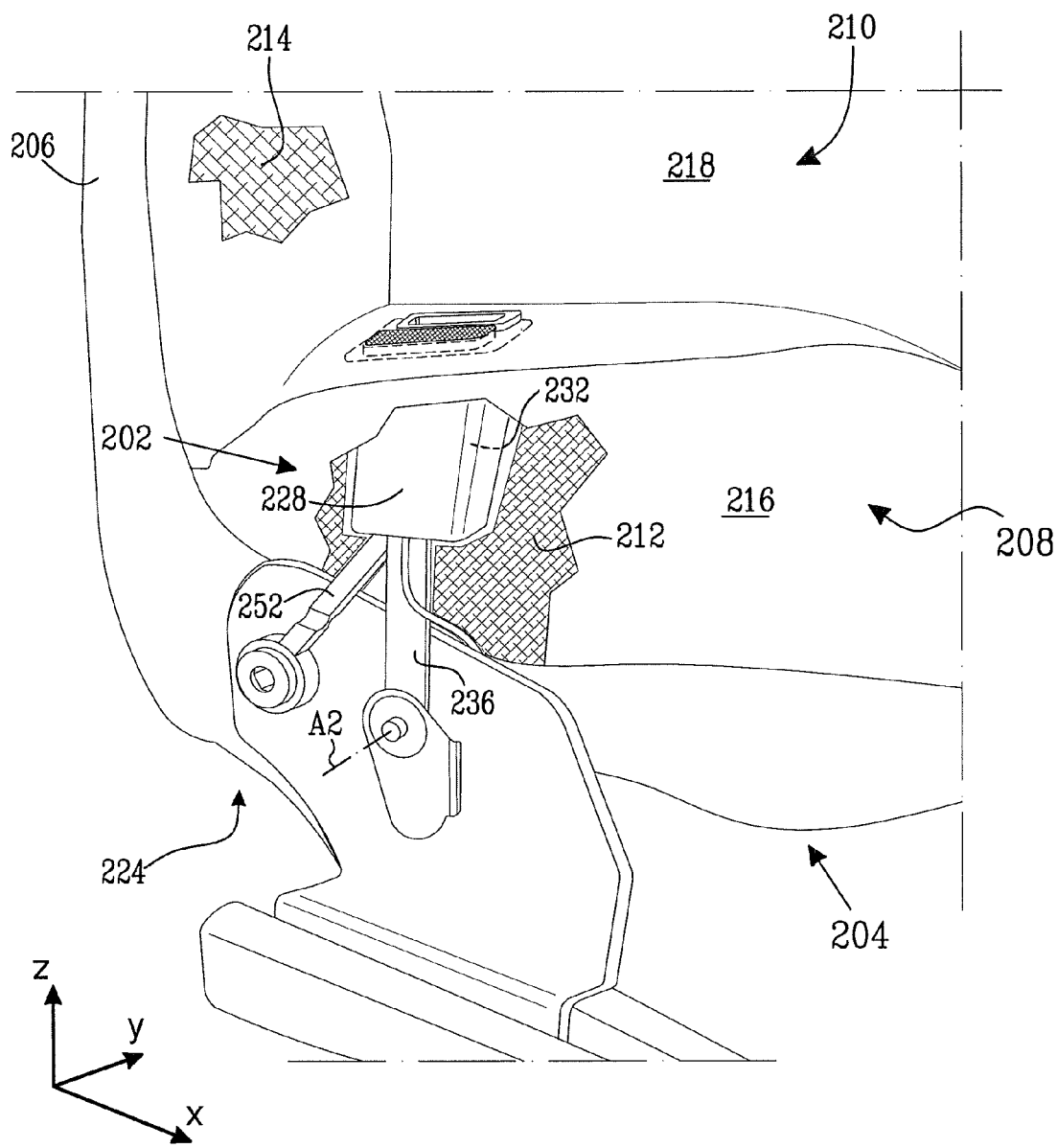
FIG. 3 illustrates a buckle arrangement mounted in a seat according to a second embodiment of the disclosure.

FIG. 3 illustrates a buckle arrangement 202 according to a second embodiment of the disclosure mounted in a rear seat 204 according to the disclosure. Elements which are also present in FIG. 2 are referred to by the same reference number as in FIG. 2 +100. For example, the buckle arrangement 102 of FIG. 2 corresponds to the buckle arrangement 202 of FIG. 3.

Correspondingly to the first embodiment, the casing 228 is recessed in the pad 212 of the squab 208. The buckle arrangement 202 is attached to the framework 206 by means of the first attachment member 236. The framework 206 connects the rear seat 204 to the vehicle body. The buckle arrangement 202 is in addition attached to the framework 206 by means of the second attachment member 252, which is much weaker than the first attachment member 236, as described for the first embodiment. A pivotal axis A2 of the first attachment member 236 is substantially parallel to a lateral direction y of the vehicle. The attachment members 236, 252 work in a corresponding way as for the first embodiment.

As an alternative, the buckle arrangement of the rear seat 204 may be recessed in the pad 214 of the seatback 210 and attached to the framework 206 in the seatback 210.

Persons sitting in the rear seat sometimes makes lateral movements in order to reach he intended position, e.g., if sitting in the central rear seat. Since the buckle arrangement 202 is recessed in the pad 212, 214, the risk that the person gets stuck in the buckle arrangement 202 during lateral displacement in the seat 204 is reduced or eliminated. Further, if the rear seat is not used, the casings 228 of the buckle arrangements 202 are concealed in the pads 212, 214, improving the visual impression of the rear seat 204.

Most details of the second embodiment are similar as for the first embodiment and will not be described again.

Further modifications of the disclosure within the scope of the appended claims are feasible. As such, the present disclosure should not be considered as limited by the embodiments and figures described herein. Rather, the full scope of the disclosure should be determined by the appended claims, with reference to the description and drawings.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A buckle arrangement for a seat for a vehicle or vessel, the buckle arrangement comprising:
a casing having an insertion slot for insertion of a latch into the casing;
a locking mechanism for locking the latch, the locking mechanism being enclosed in the casing, the insertion slot being adapted for guiding the latch to the locking mechanism;
a release element for releasing the locking mechanism, allowing releasing of the latch;
an insertion frame configured to surround the insertion slot; and
a buckle frame configured to surround the insertion frame and the release element;
wherein the insertion frame is connectable to the casing in such a way that a portion of a skin of the seat is clampable between the insertion frame and the casing, such that the insertion frame is located at least partly above the skin and at least a portion of the casing is located below the skin, and such that the insertion frame defines an opening of the insertion slot.

2. The buckle arrangement according to claim 1 wherein the buckle frame is constituted by, or comprised in, a top portion of the casing.

3. The buckle arrangement according to claim 1 further comprising a first attachment member for attachment of the buckle arrangement to the seat or a vehicle body at a first anchoring location.

4. The buckle arrangement according to claim 3 wherein the first attachment member is adapted to be attached to the seat or vehicle body in a way allowing pivotal and/or linear displacement of the first attachment member in relation to the seat or vehicle body at the first anchoring location.

5. The buckle arrangement according to claim 3 further comprising a second attachment member for attachment of the buckle arrangement to the seat or vehicle body at a second anchoring location, which is different from the first anchoring location, the second attachment member being weaker than the first attachment member.

6. The buckle arrangement according to claim 5 wherein the second attachment member comprises a weakening portion for a predefined collapse of the second attachment member.

7. The buckle arrangement according to claim 1 wherein the insertion frame and/or the release element has a curved top surface.

8. A seat for a vehicle or a vessel, the seat comprising:
a buckle arrangement according to claim 1;
a pad; and
a skin adapted to cover at least a portion of the pad and being adapted to receive a user of the seat;
wherein the buckle arrangement is at least partially recessed in the pad such that at least a portion of the casing is located beneath the skin, and wherein a portion of the skin is clamped between the insertion frame and the casing of the buckle arrangement.

9. The seat according to claim 8 wherein the casing of the buckle arrangement is fully recessed in the pad.

10. The seat according to claim 8 wherein the casing is invisible from the outside of the seat.

11. The seat according to claim 8 wherein the skin further comprises a release patch adapted to cover the release element of the buckle arrangement.

12. The seat according to claim 8 wherein a surface of the release element is located in a range of −10 mm to +10 mm in relation to a surface of the skin.

13. The seat according to claim 8 wherein the skin further comprises a release patch adapted to cover the release element of the buckle arrangement and being located outside of the insertion frame such that the insertion frame does not surround the release patch.

14. The seat according to claim 13 wherein a surface of the release patch is located in a range of −10 mm to +10 mm in relation to a surface of an adjacent portion of the skin.

15. The seat according to claim 8 wherein the insertion frame and/or the release element of the buckle arrangement have/has a curved top surface with a curvature adapted to correspond to a curvature of the pad.

16. The seat according to claim 8 wherein the seat further comprises a framework providing a first anchoring location and/or a second anchoring location for attachment to the buckle arrangement.

17. The buckle arrangement according to claim 1 wherein the release element is received in the casing such that the release element is located laterally outside of the insertion frame.

18. The buckle arrangement according to claim 1 wherein the buckle frame is adapted to be located on top of the skin of the seat as a separate component or combined with the insertion frame as an integrated unit, and wherein the skin is clampable between the integrated unit above the skin and the casing below the skin.

19. A buckle arrangement for a seat for a vehicle or vessel, the buckle arrangement comprising:

a casing that defines an insertion slot for insertion of a latch into the casing;

a locking mechanism for locking the latch, the locking mechanism being received in the casing, the insertion slot being adapted for guiding the latch to the locking mechanism;

a release element for releasing the locking mechanism, allowing releasing of the latch;

an insertion frame that is connectable to the casing in such a way that a portion of a skin of the seat is clampable between the insertion frame and the casing, and such that the insertion frame surrounds the insertion slot;

a first attachment member for attachment of the buckle arrangement to the seat or a vehicle body at a first anchoring location; and a second attachment member for attachment of the buckle arrangement to the seat or vehicle body at a second anchoring location, which is different from the first anchoring location, the second attachment member being weaker than the first attachment member.

20. The buckle arrangement according to claim 19 further comprising a buckle frame adapted to surround the insertion frame and the release element.

* * * * *